United States Patent [19]

Hayashi et al.

[11] Patent Number: 5,501,907
[45] Date of Patent: Mar. 26, 1996

[54] FIBROUS ELECTRICALLY CONDUCTIVE FILLER

[75] Inventors: Takao Hayashi, Yamaguchi; Nobuyoshi Kasahara, Saitama; Norihiro Sato; Kouichi Kawaratani, both of Yamaguchi, all of Japan

[73] Assignee: Mitsui Mining & Smelting Co., Ltd., Tokyo, Japan

[21] Appl. No.: 128,233

[22] Filed: Sep. 29, 1993

[30] Foreign Application Priority Data

Sep. 29, 1992 [JP] Japan .................. 4-283709

[51] Int. Cl.$^6$ .................. B05D 3/02; B32B 9/00
[52] U.S. Cl. .................. 428/389; 428/367; 428/373; 428/368; 428/375; 428/379; 428/384; 428/386
[58] Field of Search .................. 428/367, 368, 428/373, 379, 384, 386, 389

[56] References Cited

U.S. PATENT DOCUMENTS

| | | | |
|---|---|---|---|
| 4,743,506 | 5/1988 | Russo et al. | 428/379 |
| 4,933,109 | 6/1990 | Yamada et al. | 428/379 |
| 5,273,822 | 12/1993 | Hayashi et al. | 428/389 |
| 5,316,846 | 5/1994 | Pinsky et al. | 428/379 |

FOREIGN PATENT DOCUMENTS 4-154621  5/1992  Japan .

*Primary Examiner*—Patrick J. Ryan
*Assistant Examiner*—J. M. Gray
*Attorney, Agent, or Firm*—Sughrue, Mion, Zinn, Macpeak & Seas

[57] ABSTRACT

A fibrous electrically-conductive filler herein provided comprises fibrous aluminum borate as a core material provided thereon with, in order, an optional titanium oxide intermediate layer and an antimony-free tin oxide layer. The fibrous electrically-conductive filler can be prepared by a method which comprises the steps of optionally forming an intermediate layer of titanium oxide by depositing titanium oxide hydrate on the surface of the core material and then calcining the titanium oxide hydrate layer; then forming a coating layer of tin oxide hydrate on the surface of the titanium oxide-coated fibrous aluminum borate or the fibrous aluminum borate as a core material and then calcining the coating layer at a temperature ranging from 150° to 600° C. in an inert gas atmosphere or a reducing atmosphere to form an antimony-free tin oxide layer. The fibrous electrically-conductive filler is excellent in whiteness, non-toxic and cheap, has electrical conductivity stable to temperature and humidity changes, has a low volume resistivity, is excellent in a electrical conductivity-imparting effect per unit weight and can accordingly be incorporated into various basic materials such as paper, plastics, rubbers, resins, fibers and paints and varnishes for imparting electrical conductivity to these substances.

4 Claims, No Drawings

5,501,907

FIBROUS ELECTRICALLY CONDUCTIVE FILLER

BACKGROUND OF THE INVENTION (a) Field of the Invention

The present invention relates to a fibrous electrically-conductive filler and a method for preparing the filler. More specifically, the present invention relates to a fibrous electrically-conductive filler which is excellent in whiteness, non-toxic and cheap, which has electrical conductivity stable to temperature and humidity changes, which has a low volume resistivity, which is excellent in a electrical conductivity-imparting effect per unit weight and which can accordingly be incorporated into various basic materials such as paper, plastics, rubbers, resins, fibers and paints and varnishes for imparting electrical conductivity to these basic materials as well as a method for preparing the fibrous electrically-conductive filler.

(b) Description of the Prior Art

Electrical insulating properties of plastics become causes of various technical problems in several applications thereof. In particular, the electrical insulating properties of plastics become obstacles in, for instance, shielding electric parts from a relatively high electromagnetic field observed when a computer housing is, for instance, used or in discharging of electrically-charged parts. In addition, the electrical insulating properties of plastics likewise become causes of various problems in storing high performance explosives or IC parts, in preparing carpets which are subjected to an antistatic treatment or rubber products for medical use, or in preparing electrically-conductive adhesives for metals.

It has been known that a polymer can be converted into a electrically-conductive material through incorporation of electrically-conductive particles. As finely pulverized substances capable of imparting electrical conductivity to various basic materials such as plastics, and paints and varnishes through incorporation thereof into these basic materials, there have been known, for instance, metal particles or carbon black particles; particles of semiconductor oxides such as zinc oxide and iodides; tin oxide powder doped with, for instance, antimony or fluorine; zinc oxide powder doped with, for instance, aluminum or powder of, for instance, titanium oxide and aluminum oxide coated with tin oxide; and fibrous materials such as glass fibers, alkali metal titanate fibers and titanium oxide fibers coated with tin oxide.

If metal particles or carbon black particles are used as electrical conductivity-imparting substances, polymers are blackened through the addition of such additives. This is often undesirable in most of applications thereof. For instance, the use of zinc oxide particles suffers from a problem in that the resulting polymer shows fluctuation of the electrical conductivity due to changes in temperature and humidity. Moreover, antimony-doped tin oxide powder is excellent in a electrical conductivity-imparting ability, but the resulting polymer has a blue-black color tone due to the presence of antimony as a dopant and suffers from a problem of relatively low whiteness. Further the use of antimony as a dopant suffers from a problem of high toxicity. Thus, the polymers comprising antimony-doped tin oxide powder are substantially limited in the applications. For this reason, Japanese Un-examined Patent publication (hereinafter referred to as "J.P. KOKAI") No. Hei 4-154621 discloses a method for preparing titanium oxide powder coated with tin oxide as electrically-conductive powder free of antimony.

It has also been well-known that electrically-conductive fine substances incorporated into basic materials such as plastics and paints and varnishes must come in close contact with one another in these basic materials for imparting good electrical conductivity thereto and, therefore, if electrically-conductive spherical particles are used, a large quantity thereof must be incorporated in these basic materials. Moreover, if electrically-conductive powder used is expensive, the product obtained through incorporation thereof is limited in the applications from the viewpoint of the production cost.

To eliminate this problem, there have been proposed, for instance, the foregoing fibrous materials which have aspect ratios substantially higher than that of the spherical electrically-conductive particles and correspondingly high probability that the materials come in contact with one another when they are used in relatively small amounts. For instance, J.P. KOKAI Nos. Sho 59-102820 and Sho 62-59528 disclose electrically-conductive alkali metal titanate fibers obtained by coating fibers of alkali metal titanates represented by the formula: $M_2O.nTiO_2.mH_2O$ with tin oxide compounds as well as methods for preparing the fibers. In addition, J.P. KOKAI No. Sho 62-122005 discloses a method for preparing a white fibrous electrically-conductive filler which comprises treating alkali metal titanate fibers with an acid to liquate out the alkali components thereof and then coating the fibers with a tin oxide compound.

When these conventional fibrous electrically-conductive alkali metal titanate fillers are incorporated into basic materials such as plastics, rubbers, fibers and paints and varnishes to make them electrically electrically-conductive, they do not show any reduction in the electrical conductivity-imparting effect due to peeling off of the electrically-conductive substances from the fibrous materials, but suffer from a problem in that the alkali metal titanate fibers per se have low resistance to acids and alkalis as compared with those obtained by coating glass fibers with electrically-conductive substances. Moreover, they are easily damaged through breakage due to liquation of the alkali components during coating the electrically-conductive substances, and are micronized and made porous. This in turn increases the surface areas thereof and accordingly, the use of a large amount of a electrically-conductive substance is required for forming a electrically-conductive layer having an identical film thickness.

In general, the electrical conductivity of a product obtained through incorporation of a electrically-conductive filler is greatly dependent upon the amount (% by volume) of the electrically-conductive filler to be incorporated. Thus, the smaller the specific gravity of the electrically-conductive filler used, the smaller the amount thereof to be used for ensuring a desired electrical conductivity. In this respect, however, the foregoing alkali metal titanate fibers are not necessarily satisfied. Moreover, these alkali metal titanate fibers suffer from a problem of high toxicity since they have coated electrically-conductive layers comprising tin oxide doped with antimony.

SUMMARY OF THE INVENTION

Accordingly, an object of the present invention is to provide a fibrous electrically-conductive filler which can eliminate the foregoing drawbacks associated with the conventional techniques, more specifically a fibrous electrically-conductive filler which is excellent in whiteness, non-toxic and cheap, which has electrical conductivity stable to temperature and humidity changes and a low volume resistivity, which is excellent in a electrical conductivity-imparting effect per unit weight and which can accordingly be incorporated into various basic materials such as paper, plastics, rubbers, resins, fibers and paints and varnishes for imparting electrical conductivity to these basic materials.

Another object of the present invention is to provide a method for preparing such a fibrous electrically-conductive filler.

Under such circumstances, the inventors of this invention have conducted various studies to obtain a fibrous electrically-conductive filler free of the foregoing drawbacks, i.e., (1) a fibrous electrically-conductive filler having a low volume resistivity and ensuring a quite excellent electrical conductivity-imparting effect per unit weight (or in a small added amount) upon addition thereof to basic materials such as resins;

(2) a fibrous electrically-conductive filler which does not show any loss of electrical conductivity due to peeling off of a electrically-conductive film applied onto the surface of the filler during incorporating into basic materials such as paper, plastics, rubbers, resins, fibers, and paints and varnishes;

(3) a fibrous electrically-conductive filler which is white or transparent in itself and, accordingly capable of imparting any desired color tone to basic materials such as paper, plastics, rubbers, resins, fibers, and paints and varnishes, to which the electrically-conductive filler is incorporated, through simultaneous or separate addition of a coloring agent;

(4) a fibrous electrically-conductive filler being free of any harmful substance such as antimony, have found out that it is effective to use, as a core material, fibrous aluminum borate having high strength, high elasticity modulus, good heat resistance, good resistance to chemicals and a low true specific gravity as compared to those for the conventional alkali metal titanate fibers and have thus completed the present invention.

According to an aspect of the present invention, there is provided a fibrous electrically-conductive filler which has a light weight and excellent electrical electrical conductivity and comprises fibrous aluminum borate as a core material provided thereon with a tin oxide layer; or fibrous aluminum borate as a core material provided thereon with, in order, a titanium oxide layer and a tin oxide layer wherein the tin oxide layer is free of antimony.

According to another aspect of the present invention, there is provided a method for preparing a fibrous electrically-conductive filler comprising the steps of forming a coating layer of tin oxide hydrate on the surface of fibrous aluminum borate and then calcining the coated fibrous aluminum borate at a temperature ranging from 150° to 600° C. in an inert gas atmosphere or a reducing atmosphere to form a tin oxide layer; or forming a titanium oxide layer on the surface of fibrous aluminum borate, then forming a coating layer of tin oxide hydrate on the surface of the titanium oxide layer and then calcining the coated fibrous aluminum borate at a temperature ranging from 150° to 600° C. in an inert gas atmosphere or a reducing atmosphere to form a tin oxide layer.

The fibrous electrically-conductive filler according to the present invention has a low volume resistivity and an excellent electrical conductivity-imparting effect per unit weight upon incorporation into basic materials such as resins or paints and varnishes. Further the fibrous electrically-conductive filler is excellent in whiteness and transparency in itself. Therefore, any color tone may be imparted to these basic materials through simultaneous incorporation of the filler and coloring agents. Moreover, the filler is non-toxic since it is free of any harmful substances such as antimony. The fibrous electrically-conductive filler of the invention thus has high quality and permits the reduction of the price.

DESCRIPTION OF THE PREFERRED EMBODIMENTS

The fibrous electrically-conductive filler and the method for preparing the same according to the present invention will hereinafter be described in more detail.

Any fibrous aluminum borate may be used in the invention so far as they have fibrous shapes, but preferred are those each having a fiber length ranging from 1 to 100 μm on the average and a fiber diameter ranging from 0.1 to 5 μm on the average as determined by microscopic observation and a chemical composition represented by the formula: $9Al_2O_3 \cdot 2B_2O_3$ or $2Al_2O_3 \cdot B_2O_3$. Specific examples of such fibrous aluminum borate materials are those available from Shikoku Chemicals Corporation under the trade names of ALBOREX and ALBORITE.

In the application of a electrically-conductive tin oxide layer onto the surface of the foregoing fibrous aluminum borate material, the resulting fibrous electrically-conductive filler shows excellent electrical conductivity through direct application of the tin oxide layer on the surface of the fibrous aluminum borate, but more preferably, a titanium oxide layer is first formed on the surface of the fibrous aluminum borate as an intermediate layer and then a electrically-conductive tin oxide layer is applied onto the titanium oxide layer.

The titanium oxide layer can easily be applied by heating and hydrolyzing a solution of titanyl sulfate or titanium tetrachloride in the presence of the fibrous aluminum borate; or neutralizing and hydrolyzing the solution in the presence of the fibrous aluminum borate using an alkali. The amount of the titanium oxide layer to be applied preferably ranges from 2 to 50% by weight on the basis of the weight of the fibrous aluminum borate. The titanium oxide layer thus applied is then calcined at a temperature ranging from 150° to 900° C. The calcination ensures the subsequent formation of a uniform titanium oxide film having the rutile crystalline structure on the fibrous aluminum borate. Thereafter, a electrically-conductive tin oxide layer is applied. Thus, a tin oxide film excellent in adhesion can be formed since the crystalline structure thereof is identical to that of the titanium oxide layer as the intermediate layer. This in turn not only leads to the formation of a fibrous electrically-conductive filler having excellent electrical conductivity, but also inhibits any loss of electrical conductivity due to peeling off of the tin oxide layer formed on the electrically-conductive filler possibly observed when it is incorporated into a basic material such as a resin. Moreover, the presence of the uniform intermediate layer can inhibit any diffusion of components present in the fibrous aluminum borate such as Al and B into the electrically-conductive layer which results in a decrease of the electrical conductivity of the filler. In addition, the presence of the titanium oxide intermediate layer having a high refractive index can impart a high whiteness and good hiding power to the resulting fibrous electrically-conductive filler.

In the present invention, the amount of the titanium oxide layer to be applied preferably ranges from 2 to 50% by weight on the basis of the weight of the fibrous aluminum borate. More specifically, the amount thereof is low if transparency is required for the resulting film, while it is high if a high whiteness is required for the resulting film. This is because, if the amount is less than 2% by weight, any uniform film of titanium oxide cannot be formed on the surface of the fibrous aluminum borate and accordingly, the foregoing effects cannot be anticipated at all. On the other hand, if it exceeds 50% by weight, free titanium oxide remains on the surface of the fibrous aluminum borate and as a result, the true specific gravity of the titanium oxide-coated aluminum borate undesirably increases.

Then the foregoing fibrous aluminum borate or the titanium oxide-coated fibrous aluminum borate is dispersed in water to form a tin oxide layer thereon. The film of tin oxide has a thickness ranging from 2 to 80 nm and preferably 5 to 30 nm. If the thickness of the film is less than 2 nm, the resulting coated fibrous aluminum borate has insufficient electrical conductivity and, therefore, a satisfactory antistatic effect cannot be anticipated upon incorporation of the filler into a resin matrix. On the other hand, if it exceeds 80 nm, the intended effects cannot be improved any further in proportion to an increase in its cost.

It can be recomended to use the following methods for coating the fibrous aluminum borate or the titanium oxide-coated fibrous aluminum borate (hereinafter collectively referred to as "the fibrous aluminum borate") with tin oxide: (1) a method comprising the steps of gradually adding an ethanol solution containing a desired amount of stannic chloride to a slurry obtained by dispersing the fibrous aluminum borate in water maintained at a temperature ranging from 60° to 80° C. to hydrolyze them and precipitate a tin oxide hydrate to thus form a coating film on the fibrous aluminum borate, followed by filtration, water-washing, drying and calcination at a temperature ranging from 150° to 600° C. in an inert gas atmosphere or a reducing atmosphere to give a tin oxide layer; (2) a method comprising the steps of simultaneously adding a solution of a predetermined amount of stannic chloride in water and an aqueous alkaline solution to a slurry obtained by dispersing the fibrous aluminum borate in water maintained at a temperature ranging from 60° to 80° C., while maintaining the pH of the slurry to a level of 2 to 5, to thus deposit tin oxide hydrate on the fibrous aluminum borate in the form of a film, followed by filtration, water-washing, drying and calcination at a temperature ranging from 150° to 600° C. in an inert gas atmosphere or a reducing atmosphere to give a tin oxide layer; and (3) a method comprising the steps of adding a solution of an alkali metal stannate to a slurry obtained by dispersing the fibrous aluminum borate in water maintained at a temperature ranging from 60° to 80° C. and gradually reducing the pH of the slurry to 1.5 to 4.0 through addition of a dilute sulfuric acid solution to thus deposit tin oxide hydrate on the fibrous aluminum borate in the form of a film, followed by filtration, water-washing, drying and calcination at a temperature ranging from 150° to 600° C. in an inert gas atmosphere or a reducing atmosphere to give a tin oxide layer. Among these methods, particularly preferred is the foregoing method (3) because of high adhesion of the resulting tin oxide film to the fibrous aluminum borate and easiness of handling.

The method for preparing a fibrous electrically-conductive filler according to the present invention permits highly complete coverage of the fibrous aluminum borate with tin oxide with ease and within a short period of time and the resulting fibrous electrically-conductive filler exhibits high dispersibility in resins.

In the fibrous electrically-conductive filler according to the present invention, fibrous aluminum borate or titanium oxide-coated fibrous aluminum borate is used as a core material and a thin film simply comprising tin oxide is applied onto the surface of the core material. Therefore, the filler of the invention is cheaper than the fibrous aluminum borate coated with a tin oxide film doped with antimony, does not develop any blue-black color tone due to the presence of antimony as a dopant and thus has an excellent whiteness. Furthermore, the thin film of tin oxide is transparent, aluminum borate as the core material has a low refractive index and, therefore, the incorporation thereof into basic materials such as paints and varnishes, resins and plastics does not impair the transparency of these basic materials. As a result, any desired color tone can be imparted to these basic materials by simultaneous incorporation of the fibrous electrically-conductive filler of the invention and a coloring agent. Further the filler is non-toxic and has an electrical conductivity stable to changes in temperature and humidity and is highly dispersible in plastics.

The fibrous electrically-conductive filler according to the present invention can be incorporated into various basic materials such as paper, plastics, rubbers, resins, fibers and paints and varnishes to impart electrical conductivity to these basic materials and accordingly, can be used in various fields such as means for protecting precision electronic machinery and tools from various troubles due to the generation or presence of electrostatic charges; means for electrostatic disaster prevention; housings for dustproof; construction materials; fibers; and parts of machinery. Moreover, the fibrous electrically-conductive filler according to the present invention may likewise be used in the preparation of duplicating machine-related parts and substances such as electrically-conductive rollers and light-sensitive drums as a charge-controlling agent, and in the preparation of lead storage batteries as an electrode-improving agent.

The present invention will hereunder be described in more detail with reference to the following working Examples, but the present invention is not limited to these specific Examples.

Example 1

To 100 l of water, there was dispersed 20 kg of fibrous aluminum borate (available from Shikoku Chemicals Corporation under the trade name of ALBOREX Y) having an averaged fiber length of 21 μm and an averaged fiber diameter of 1.0 μm as determined by microscopic observation and a specific surface area of 1.8 $m^2/g$ as determined by the BET method, followed by heating to 40° C. under stirring with a stirrer, addition of 12.88 kg of a titanium sulfate solution (Ti content: 4.9%) to the resulting slurry, heating of the slurry up to 95° C., stirring over 60 minutes, filtration of the slurry, water-washing and drying. Thereafter, the fibrous aluminum borate thus treated was calcined at 600° C. for 2 hours to give 21 kg of titanium oxide-coated fibrous aluminum borate.

To 70 l of water, there was dispersed 20 kg of the resulting titanium oxide-coated fibrous aluminum borate, followed by heating of the slurry up to 70° C., control of the pH thereof to 12 through addition of a 25% aqueous caustic soda solution, addition of a solution of 16.88 kg of sodium stannate (Sn content: 40%) in 40 l of water to the slurry, stirring of the slurry for 30 minutes and neutralization thereof through addition of a 20% aqueous solution of sulfuric acid to a pH level of 2.5 over 90 minutes. Thereafter, the slurry was ripened for 120 minutes while maintaining the pH at 2.5 and the temperature at 70° C., filtered, washed with water, dried and then calcined at 450° C. for 2 hours in a nitrogen gas atmosphere in a rotary kiln to give 28.5 kg of a fibrous electrically-conductive filler according to the present invention. The fibrous electrically-conductive filler had a tin content of 30% as expressed in terms of the amount of $SnO_2$. The fibrous electrically-conductive filler was then pressure-molded, at a pressure of 2 ton/cm$^2$, into a specimen and then the volume resistivity thereof was determined using a low resistance-determining device (Loresta AP, available from Mitsubishi Petrochemical Co., Ltd.). The specific surface area thereof was also determined by the BET one-point method and the color difference thereof was determined on the basis of the values, L*, a* and b* which were measured by a color computer (SM-5 Type, available from Suga Testing Machine Co., Ltd.). The results thus obtained are summarized in the following Table 1. In addition, the fibrous electrically-conductive filler was examined by a transmission electron microscope and it was found that the fibrous electrically-conductive filler particles each was uniformly covered with a tin oxide film and that any free tin oxide was not present at all.

Example 2

To 1500 ml of water, there was dispersed 100 g of the titanium oxide-coated fibrous aluminum borate obtained according to the same procedures used in Example 1, followed by heating of the resulting slurry up to 80° C., addition of 400 ml of a solution of stannic chloride (70.08 g; $SnCl_4$ content: 98%) in ethanol to the slurry over 2 hours to deposit tin oxide hydrate on the surface of the titanium oxide-coated fibrous aluminum borate in the form of a layer, filtration, water-washing, drying and calcination at 450° C. for 2 hours in a nitrogen gas atmosphere to give 138 g of a fibrous electrically-conductive filler according to the present invention. The fibrous electrically-conductive filler had a tin content of 28% as expressed in terms of the amount of $SnO_2$. The volume resistivity, specific surface area and color difference of the resulting fibrous electrically-conductive filler were determined in the same manner used in Example 1. The results thus obtained are listed in the following Table 1.

Example 3

To 70 l of water, there was dispersed 20 kg of fibrous aluminum borate, followed by heating of the slurry up to 70° C., control of the pH thereof to 12 through addition of a 25% aqueous caustic soda solution, addition of a solution of 16.88 kg of sodium stannate (Sn content: 40%) in 40 l of water to the slurry, stirring of the slurry for 30 minutes and neutralization thereof through addition of a 20% aqueous solution of sulfuric acid to a pH level of 2.5 over 90 minutes. Thereafter, the slurry was ripened for 120 minutes while maintaining the pH at 2.5 and the temperature at 70° C., filtered, washed with water, dried and then calcined at 450° C. for 2 hours in a nitrogen gas atmosphere in a rotary kiln to give 28.5 kg of a fibrous electrically-conductive filler according to the present invention. The fibrous electrically-conductive filler had a tin content of 30% as expressed in terms of the amount of $SnO_2$. The volume resistivity, specific surface area and color difference of the resulting fibrous electrically-conductive filler were determined in the same manner used in Example 1. The results thus obtained are listed in the following Table 1. In addition, the fibrous electrically-conductive filler was examined by a transmission electron microscope and it was found that the fibrous electrically-conductive filler particles each was uniformly covered with a tin oxide film and that any free tin oxide was not present at all.

Examples 4 to 12

The same procedures used in Example 1 were repeated except that the rate of coated titanium oxide, the temperature of calcination performed after coating with titanium oxide, the rate of coated tin oxide, the calcination temperature, the calcination time and the atmosphere used for the calcination were changed to those listed in Table 1 respectively to give fibrous electrically-conductive fillers according to the present invention. The volume resistivity, specific surface area and color difference of each resulting fibrous electrically-conductive filler of the invention were determined in the same manner used in Example 1. The results thus obtained are listed in Table 1. In addition, the fibrous electrically-conductive fillers each was examined by a transmission electron microscope and it was found that the fibrous electrically-conductive filler particles each was uniformly covered with a tin oxide film and that any free tin oxide was not present at all.

Reference Example 1

The fibrous electrically-conductive filler prepared in Example 1, a commercially available electrically-conductive potassium titanate fiber and electrically-conductive needle-like titanium oxide each was mixed with MPA/SOLVESSO 200 (in a solvent in a ratio of 2/1) and a polyester resin (DYNAPOLE L206) in a compounding ratio (PWC) listed in the following Table 2, dispersed for 90 minutes using a paint conditioner, applied to a polyester film with an applicator and dried to give a coated film having a thickness of 15 μm. The surface resistivities of these coated films were determined by HIGHRESTA HP available from Mitsubishi Petrochemical Co., Ltd. The results thus obtained are summarized in Table 2. The term "compounding ratio (PWC)" herein used is defined as follows:

[(filler weight)/(filler weight+resin weight)]×100(%)

When the fibrous electrically-conductive filler of the invention is incorporated into paints and varnishes, only a small amount of the filler can ensure an excellent electrical conductivity-imparting effect.

Reference Example 2

The fibrous electrically-conductive filler prepared in Example 1, a commercially available electrically-conductive potassium titanate fiber and electrically-conductive needle-like titanium oxide each was mixed with a low density polyethylene (LDPE) in a compounding ratio (PWC) listed in the following Table 3, kneaded with heat rolls (two rolls) and formed into a plate-like product having a thickness of 3 mm using a hot press. The surface resistivities of these products were determined by HIGHRESTA HP available from Mitsubishi Petrochemical Co., Ltd. The results thus obtained are summarized in Table 3.

The data listed in Table 3 clearly indicate that the fibrous electrically-conductive filler according to the present invention exhibits an excellent electrical conductivity-imparting effect even when it was incorporated into a basic material through kneading in only a small amount.

TABLE 1

| Ex. No. | Rate of Coated $TiO_2$ % | Calcination temperature for coated $TiO_2$ °C. | Rate of Coated $SnO_2$ % | Calcination Temp. (°C.) | Calcination Time (min) | Calcination Atmosphere | Volume Resistivity ($\Omega \cdot$ cm) | Specific Surface Area m²/g | Color Difference L* | a* | b* |
|---|---|---|---|---|---|---|---|---|---|---|---|
| 1 | 5 | 600 | 30 | 450 | 120 | $N_2$ | 300 | 17.0 | 82.0 | 0.4 | 7.6 |
| 2 | 5 | 600 | 28 | 450 | 120 | $N_2$ | 450 | 18.5 | 85.0 | 0.1 | 1.2 |
| 3 | 0 | — | 30 | 450 | 120 | $N_2$ | 350 | 16.8 | 81.0 | 0.3 | 5.8 |
| 4 | 5 | 600 | 10 | 550 | 120 | $N_2$ | 5300 | 8.0 | 86.3 | −0.2 | 6.3 |
| 5 | 5 | 600 | 20 | 450 | 60 | $N_2$ | 3200 | 11.7 | 84.3 | 0.3 | 3.8 |
| 6 | 5 | 600 | 40 | 450 | 120 | $N_2$ | 110 | 23.0 | 82.2 | −1.2 | 4.1 |
| 7 | 10 | 900 | 30 | 400 | 120 | $N_2 + H_2$ | 100 | 18.0 | 78.0 | −0.5 | 5.4 |
| 8 | 30 | 900 | 20 | 400 | 120 | $N_2$ | 2700 | 10.3 | 90.2 | 0.2 | 1.9 |
| 9 | 5 | 300 | 30 | 450 | 120 | $N_2$ | 550 | 18.2 | 81.6 | 0.3 | 5.4 |
| 10 | 5 | 600 | 30 | 200 | 180 | $N_2 + H_2$ | 200 | 17.8 | 81.5 | −0.3 | 4.2 |
| 11 | 5 | 600 | 30 | 300 | 180 | $N_2$ | 2200 | 17.5 | 89.0 | −0.1 | 3.2 |
| 12 | 5 | 600 | 30 | 500 | 60 | $N_2 + H_2$ | 80 | 14.0 | 73.0 | −0.7 | 1.7 |

(The atmosphere used in Examples 7, 10 and 12 comprised 95 vol % $N_2$ and 5 vol % $H_2$)

TABLE 2

| Kind of electrically-conductive filler | Compounding ratio PWC, % | Surface resistivities of coated films $\Omega/\square$ |
|---|---|---|
| Filler of the present invention | 20 | $5.4 \times 10^6$ |
|  | 30 | $3.8 \times 10^5$ |
|  | 40 | $2.3 \times 10^4$ |
| Electrically-conductive potassium titanate fiber | 20 | $3.2 \times 10^8$ |
|  | 30 | $4.2 \times 10^5$ |
|  | 40 | $7.6 \times 10^4$ |
| Electrically-conductive needle-like titanium oxide | 20 | $5.4 \times 10^8$ |
|  | 30 | $5.6 \times 10^6$ |
|  | 40 | $4.1 \times 10^5$ |

TABLE 3

| Kind of electrically-conductive filler | Compounding ratio PWC, % | Surface resistivities of Products $\Omega/\square$ |
|---|---|---|
| Filler of the present invention | 35 | $10^7$ |
|  | 40 | $10^5$ |
| Electrically-conductive potassium titanate fiber | 40 | $10^{12}<$ |
|  | 50 | $10^7$ |
| Electrically-conductive needle-like titanium oxide | 40 | $10^{12}<$ |
|  | 50 | $10^7$ |

As has been discussed above in detail, the present invention ensures the following effects:

(1) The fibrous electrically-conductive filler according to the present invention exhibits excellent electrical conductivity in itself and shows an excellent electrical conductivity-imparting effect upon incorporation into basic materials such as resins, rubbers, fibers and paints and varnishes.

(2) The presence of an intermediate layer of titanium oxide permits the formation of a electrically-conductive film firmly adhered to the core material. Therefore, the electrically-conductive layer is never peeled off from the surface of the fibrous electrically-conductive filler by mechanical actions such as abrasion during the incorporation thereof into a basic material.

(3) The fibrous electrically-conductive filler of the present invention may be white or transparent depending on the applications and accordingly, any desired color tone can be imparted to a basic material by simultaneously incorporating the filler and an organic or inorganic coloring agent into the basic material.

(4) The fibrous electrically-conductive filler of the present invention is completely free of harmful substances such as antimony.

(5) The fibrous electrically-conductive filler of the present invention is a fibrous filler and has high strength, high modulus of elasticity, high heat resistance and high resistance to chemicals. Therefore, the filler shows an effect of mechanically reinforcing a basic material such as a resin and is stable to any change of ambient conditions with time during use.

What is claimed:

1. A fibrous electrically-conductive filler comprising fibrous aluminum borate as a core material and a layer of a tin oxide coated on said fibrous aluminum borate, said tin oxide being free of antimony.

2. The fibrous electrically-conductive filler as set forth in claim 1 wherein the core material has an averaged fiber length ranging from 1 to 100 μm, and an average fiber diameter ranging from 0.1 to 5 μm, and a chemical composition represented by the formulas: $9Al_2O_3 \cdot 2B_2O_3$ or $2Al_2O_3 \cdot B_2O_3$.

3. The fibrous electrically-conductive filler as set forth in claim 1 which further contains a layer of titanium oxide in the amount of 2–50% by weight on the basis of the fibrous aluminum borate between the core material and the antimony-free tin oxide layer.

4. The fibrous electrically-conductive filler as set forth in claim 3 wherein the core material has an averaged fiber length ranging from 1 to 100 μm and an averaged fiber diameter ranging from 0.1 to 5 μm, and a chemical composition represented by the formula: $9Al_2O_3 \cdot 2B_2O_3$.

* * * * *